April 22, 1930.                F. ADAMS                1,755,283
ROTOR WINDING AND METHOD OF MOUNTING END RINGS
Filed July 11, 1927
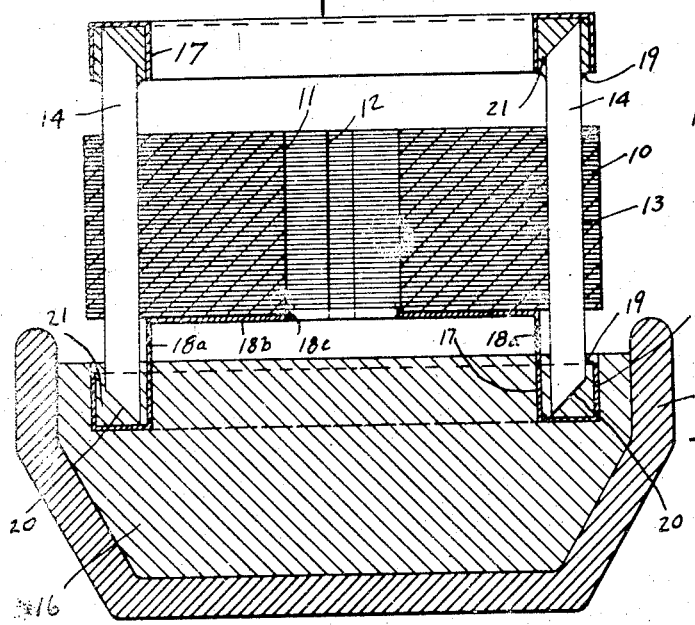
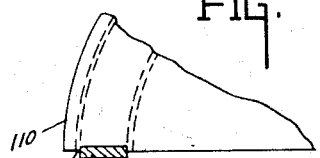
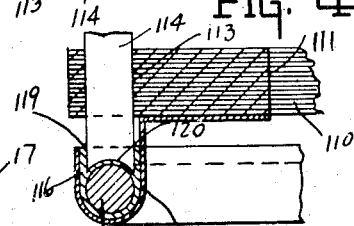
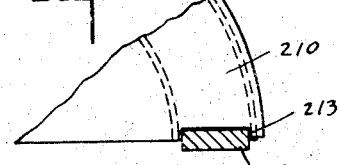
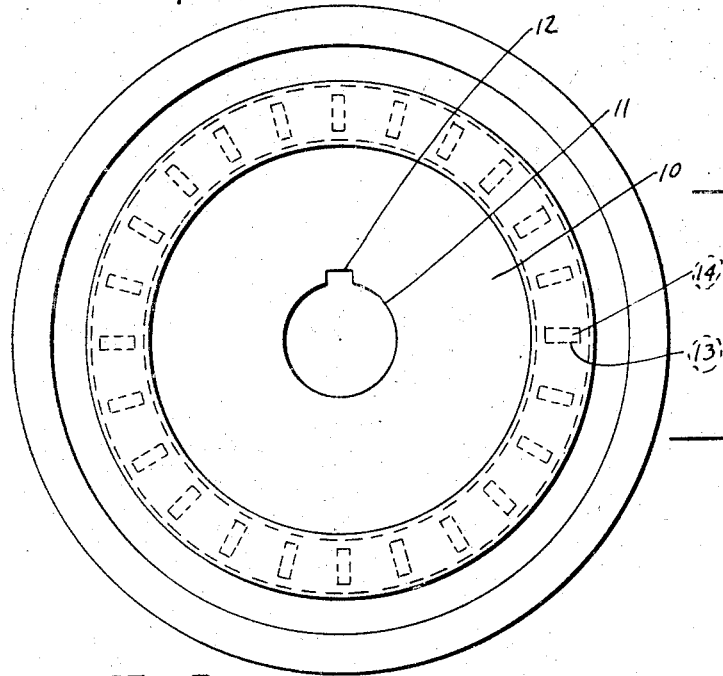
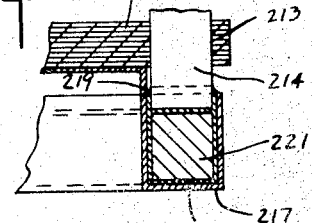
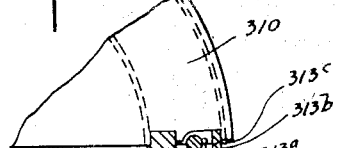
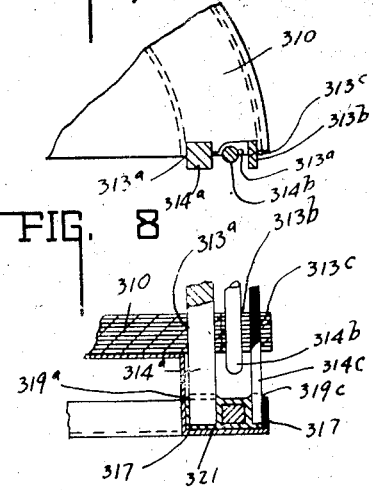
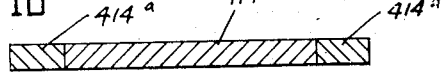
INVENTOR.
FRANK ADAMS.
BY
ATTORNEYS.

Patented Apr. 22, 1930

1,755,283

UNITED STATES PATENT OFFICE

FRANK ADAMS, OF INDIANAPOLIS, INDIANA

ROTOR WINDING AND METHOD OF MOUNTING END RINGS

Application filed July 11, 1927. Serial No. 204,889.

This invention relates to an improved end ring and winding for the rotors of alternating current motors of the squirrel cage type.

The chief object of this invention is to improve the end ring and winding construction of a squirrel cage motor rotor and also improve the operating characteristics of the motor and produce the aforesaid improved end ring and winding construction by an improved method.

The chief feature of the invention consists in the accomplishment of the foregoing object by casting under control conditions an end ring and simultaneously securing the same to the rotor windings.

The full nature of the invention will be understood from the accompanying drawings and the following description and claims:

In the drawings Fig. 1 is a transverse sectional view of a rotor having a completed end ring thereon and the opposite end in the stage of formation with the means for forming the same. Fig. 2 is a side elevation of a squirrel cage rotor. Fig. 3 is a plan view of a part of a modified form of rotor. Fig. 4 is a transverse section of the rotor shown in Fig. 3 with the end ring completed thereon. Fig. 5 is a partial plan view of a modified form of the end ring with one of the windings shown in section. Fig. 6 is a transverse section thru a portion of the winding shown in Fig. 5 showing a portion of the completed end ring thereon. Fig. 7 is a view similar to Figs. 3 and 5 and of a further modified form of the invention. Fig. 8 is a view similar to Figs. 4 and 6 and of the form of the invention shown in Fig. 7. Fig. 9 is a side elevation of the modified winding shown in Figs. 7 and 8. Fig. 10 is a longitudinal section therethru.

In the drawings 10 indicates the laminations comprising the laminated core of a rotor for a squirrel cage alternating current induction motor. The laminated core is circular in outline, as shown in Fig. 2, and includes a circular opening 11 for the shaft and the core is also slotted at 12 for keying the shaft thereto. The laminations are all slotted at 13 with a plurality of circularly arranged slots which are arranged in spaced relation, the slots of each lamination registering with the adjacent laminations to provide a passage for the reception of rotor windings 14.

Heretofore each rotor winding element has projected beyond the laminated core and an end ring has been secured thereto for forming a closed circuit arrangement. The end ring has been secured by welding or brazing resulting in poor electrical characteristics and imperfect mechanical connection or injury to windings.

The present invention contemplates the simultaneous formation of the end ring by casting and simultaneous anchorage thereof to the rotor windings in the casting operation. In Fig. 1, 15 indicates a suitable receptacle or crucible containing molten metal 16 of the desired characteristics and suitable for forming an end ring.

A mold consisting of a drawn sheet steel is indicated at 17. This mold has a spacing portion in the form of straps of annular arrangement 18ª and a plate portion 18ᵇ having a central cutting cut-out 18ᶜ. The mold proper is annular and of suitable cross section in outline and is indicated by the numeral 17. By the aforesaid arrangement, the mold is coaxially positioned to the laminated core central opening and the aforesaid secures the end ring in predetermined spaced relation to said core and the end of the rotor windings project into the mold.

The rotor with the mold is immersed into the molten metal 16 in the receptacle 15 until the level of the metal is some higher than the level of the mold which results in the filling of the mold with pure liquid metal to form an end ring and simultaneously anchor thereto the rotor windings which project from the core. Since the level of the metal in the vessel is slightly higher than the level of the mold, a bead, fillet or collar 19 remains and peripherally encloses the junction between the end ring and the winding and forms a joint which has no poor electrical operating characteristic and which is mechanically perfect. The depth of immersion is relatively unimportant except to obtain purity compared to the simultaneous formation of the end ring and its anchorage to the windings. After the mold has been filled, the rotor is removed from the vessel and the molten metal trapped in the mold forms the end ring with the bead 19 surrounding each joint. The mold may be removed if desired but the same is not necessary or usually contemplated since the end ring and ends of the windings are mechanically shielded thereby. Furthermore, the steel shield or mold serves to increase the starting torque of the squirrel cage rotor in relation to current drawn by motor by reason of the current characteristic or skin effect of the steel shield on the surface of the end ring, thereby improving the operating characteristics of a motor, the rotor of which has its end ring so shielded.

The foregoing method of forming the end ring and of uniting the same to the windings, it will be apparent, eliminates all machining operations heretofore employed in forming end rings and eliminates all of the welding, brazing, or other methods of uniting the end ring when formed to the projected or extended ends of the rotor windings.

It will also be apparent that the foregoing process permits in general the formation of the end ring of the desired material, that is, the proper alloy having the desired and necessary conductivity and mechanical strength and since the depth of immersion can be controlled, the possibilities of producing blow holes or gas failures are substantially eliminated.

In Fig. 1 the extended or projecting ends of the windings are shown provided with biased ends 20 and the windings are substantially rectangular, see Fig. 2 in cross-section. In Figs. 3 and 4 the winding 114 is shown substantially rectangular but the end is arcuate as at 120. When the end ring is required to be of a material of higher conductivity than the molten metal or mounting material, an additional element or end ring core 121 is provided which is positioned in the combination shield and mold 117 and all of the foregoing are united together by the molten material 116 and collar 119 is produced as previously set forth. In this way two materials of different conductivity such as the windings 114 and end ring core 121 are perfectly united together.

In Figs. 5 and 6 the end ring core 221 is shown rectangular and of dissimilar conductivity than the winding 214. The combination shield and mold 217 retains the uniting metal 216 in uniting position, the collar 219 also being formed between the same and the winding 214. Herein the completed end ring is shown of square cross section, whereas, in Figs. 3 and 4 the completed end ring is shown semi-circular and the core is shown circular in cross section.

Figs. 7 and 8 illustrate a multiple winding for the squirrel cage rotor and herein the laminations 310 are provided with a plurality of apertures or slots $313^a$, $313^b$ and $314^c$. The trough 317 includes the end ring core 321 into which projects and is anchored the two series of windings $314^a$ and $314^c$. The winding $314^b$ does not extend into the end ring. Each of the winding extensions anchored to the end ring is provided with the beaded or collar portion $319^a$ or $319^c$. The end ring core 321 is confined by the combination mold and shield 317.

While Figs. 7 and 8 show a multiple construction, they also illustrate an improved type of winding. The aforesaid is best illustrated in Figs. 9 and 10. In certain instances it is desirable to have a winding of relatively low melting point and high electrical resistance, such as brass and to have an end ring of relatively high melting point. If such is the case, then the aforesaid process cannot be employed because the ends of the low melting point windings will melt and fuse before they can be embodied in an end ring. Therefore, to each main portion of the winding 414 there is suitably secured by any satisfactory method which will insure sufficiently satisfactory electrical and mechanical connection, a pair of high melting point ends or extensions $414^a$, which—see Fig. 8—herein includes a fused joint arrangement. With the addition of a winding extension of relatively high melting point, the low melting point windings which are highly desirable for certain operating purposes can be employed with the foregoing process and generally the high melting point extensions $414^a$ are of such a character that they sufficiently oppose the rapid transference of heat from the end ring being formed of molten metal to the low melting main windings 414 and thus the more fusible main winding portion is secured to the end ring by the aforesaid process without damage to the winding.

The invention claimed is:

1. In the process of forming squirrel cage rotors, the step of immersing an end ring forming mold with projecting ends of the rotor winding extending therein into molten metal of the desired character until the mold and ends are covered to simultaneously form an end ring and unite the end ring to the winding ends for completing the rotor winding.

2. In the process of forming squirrel cage rotors, the steps of positioning projecting rotor winding ends into an end ring forming mold, immersing the mold and included ends into molten metal until covered, and removing the mold when filled from said molten metal to simultaneously form an end ring in the mold and unite the ring to the winding ends for completing the rotor winding.

3. In the process of forming squirrel cage rotors, the steps of positioning in an end ring forming mold shield form an end ring core and the winding projecting ends of the rotor, immersing the mold into molten metal of the desired character until it is filled, and removing the mold and rotor parts from the metal to simultaneously form a shielded and cored end ring and unite the latter to the winding ends.

4. A squirrel cage rotor comprising a laminated core, a plurality of concentric annular series of winding members extending therethrough and terminating in projecting ends, a single end ring secured to all of the same ends of each annular series of windings, said end ring being cast and simultaneously secured to said ends in the casting thereof, and a metal shield partially enclosing the end ring and forming a mold therefor in the casting thereof.

5. A squirrel cage rotor comprising a laminated core, an annular series of winding members extending therethrough and terminating in projecting ends, an end ring secured to the ends of said windings, said end ring being cast and simultaneously secured to said ends in the casting thereof, and a metal shield partially enclosing the end ring and forming a mold therefor in the casting thereof.

6. A squirrel cage rotor comprising a laminated core, an annular series of winding members extending therethrough and terminating in projecting ends, an end ring core positionable adjacent the terminating ends, a cast end ring enclosing said core and uniting the same to the projecting winding ends, and a shield partially enclosing the cored end ring and serving as a mold for the latter in the casting thereof and a support and retainer for the core in the same operation.

7. A squirrel cage rotor comprising a laminated core having a central opening therein, an annular series of winding members extending transversely through the core and terminating in projecting ends, an end ring having a cast connection with the projecting ends of the windings and embedding the same therein, and a combination core member having an end ring forming mold portion, a central mold anchoring portion receivable by the core central opening for centering the mold, and an intermediate connecting portion for positioning the mold portion in spaced relation to the core.

8. A completed squirrel cage rotor comprising a laminated core having a central opening therein, an annular series of winding members extending transversely through the core and terminating in projecting ends, an end ring having a cast connection with the projecting ends of the windings and embedding the same therein, and a combination core member having an end ring forming mold portion of suitable metallic character for serving as a mold and of suitable electric and metallic character for serving as an end ring shield, a central mold anchoring portion receivable by said central opening for centering the mold, and an intermediate connecting portion for positioning the mold portion in spaced relation to the core.

In witness whereof, I have hereunto affixed my signature.

FRANK ADAMS.